US009661265B2

(12) United States Patent
Kim et al.

(10) Patent No.: US 9,661,265 B2
(45) Date of Patent: *May 23, 2017

(54) METHOD OF CONVEYING EMOTION IN VIDEO TELEPHONE MODE AND WIRELESS TERMINAL IMPLEMENTING THE SAME

(71) Applicant: Samsung Electronics Co., Ltd., Gyeonggi-do (KR)

(72) Inventors: Hwan Kim, Gyeongsangbuk-do (KR); Jeong-Hoon Kim, Gyeongsangbuk-do (KR); Chae-Whan Lim, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,768

(22) Filed: Dec. 20, 2013

(65) Prior Publication Data
US 2014/0104364 A1    Apr. 17, 2014

Related U.S. Application Data

(63) Continuation of application No. 11/376,302, filed on Mar. 16, 2006, now Pat. No. 8,614,730.

(30) Foreign Application Priority Data

Jul. 22, 2005 (KR) .................. 10-2005-0066876

(51) Int. Cl.
H04N 7/14      (2006.01)
H04M 1/725     (2006.01)
H04N 7/15      (2006.01)

(52) U.S. Cl.
CPC .............. *H04N 7/141* (2013.01); *H04N 7/147* (2013.01); *H04M 1/72544* (2013.01); *H04N 7/157* (2013.01)

(58) Field of Classification Search
USPC ........... 348/14.01–14.08; 455/566, 550, 557; 379/142
See application file for complete search history.

(56) References Cited

U.S. PATENT DOCUMENTS 5,657,246 A * 8/1997 Hogan .................. H04N 7/142
  348/14.01
6,119,147 A * 9/2000 Toomey et al. ............... 709/204
(Continued)

FOREIGN PATENT DOCUMENTS

EP          1536645        6/2005
KR      1020040110875     12/2004
WO       WO2004111901     12/2004

*Primary Examiner* — Maria El-Zoobi
(74) *Attorney, Agent, or Firm* — The Farrell Law Firm, P.C.

(57) ABSTRACT

Methods are provided for transmitting an emoticon to another party in video telephony communication. Another party's video data is displayed on a first area of a display unit, a user's video data is displayed on a second area of the display unit, and a plurality of emoticons is displayed on a third area of the display unit in a video telephony communication. One of the plurality of emoticons is selected during the video telephony communication from a user input. The selected emoticon is displayed on the first area or on the second area and transmitting the selected emoticon to another party.

15 Claims, 3 Drawing Sheets

(56) References Cited

U.S. PATENT DOCUMENTS

| | | | |
|---|---|---|---|
| 6,587,138 B1 | 7/2003 | Vogt et al. | |
| 6,825,873 B2 | 11/2004 | Nakamura et al. | |
| 6,948,131 B1* | 9/2005 | Neven | H04L 12/1813 348/E7.083 |
| 7,003,040 B2 | 2/2006 | Yi | |
| 7,339,604 B1* | 3/2008 | Barraclough | H04N 7/147 348/14.01 |
| 7,339,640 B2* | 3/2008 | Chang et al. | 349/114 |
| 7,697,960 B2 | 4/2010 | Seo et al. | |
| 7,808,521 B2 | 10/2010 | Lengeling et al. | |
| 7,913,176 B1 | 3/2011 | Blattner et al. | |
| 8,174,556 B1 | 5/2012 | Barraclough et al. | |
| 8,271,030 B2 | 9/2012 | Lee | |
| 2004/0064510 A1 | 4/2004 | Ooi et al. | |
| 2004/0097221 A1 | 5/2004 | Lee | |
| 2005/0050141 A1 | 3/2005 | An et al. | |
| 2005/0069852 A1 | 3/2005 | Janakiraman et al. | |
| 2005/0253850 A1 | 11/2005 | Kang et al. | |
| 2006/0050141 A1* | 3/2006 | Yoshimura | H04N 7/142 348/14.02 |
| 2006/0152575 A1* | 7/2006 | Amiel | H04N 7/147 348/14.01 |
| 2009/0040289 A1 | 2/2009 | Hetherington et al. | |

* cited by examiner

US 9,661,265 B2

METHOD OF CONVEYING EMOTION IN VIDEO TELEPHONE MODE AND WIRELESS TERMINAL IMPLEMENTING THE SAME

PRIORITY

This application is a Continuation Application of U.S. Pat. No. 8,614,730, issued on Dec. 24, 2013, which claims the benefit under 35 U.S.C. §119(a) of Korean Patent Application No. 2005-66876, filed Jul. 22, 2005 in the Korean Intellectual Property Office, the entire contents of which are hereby incorporated by reference.

BACKGROUND OF THE INVENTION

Field of the Invention

The present invention relates to a method and wireless terminal for conveying an emotion to another party while in video telephone mode. More particularly, the present invention relates to a method and a wireless terminal where an emoticon representing an emotion can be transmitted to another party while performing video communication.

Description of the Related Art

Presently, wireless mobile phones have been developed so as to have a structure which enables high-speed data transmission in addition to conventional voice communication. Namely, mobile communications networks, according to IMT 2000 specifications, may facilitate high-speed data communication in addition to voice communication with a wireless mobile terminal. The data transmitted through the wireless terminal in data communication may include packet data and video data. Wireless terminals have also been provided with a camera and video receiver to add a video displaying function, so that it may display or transmit moving or still pictures taken by the camera, and display received video signals.

Thus, a wireless terminal having video communication function enables the user to transmit and receive video data together with audio data. If such a wireless terminal with video communication function is provided with means for transmitting an emoticon representing an emotion to another party, the video communication will become far more vivid and friendly. Accordingly, there is a need for an improved method of conveying an emotion on a wireless terminal.

SUMMARY OF THE INVENTION

Exemplary embodiments of the present invention address at least the above problems and/or disadvantages and provide at least the advantages described below. Accordingly, an aspect of the present invention is to provide a method and wireless terminal enabling a user to display on his or her wireless terminal, and transmit to another party, an emoticon representing an emotion.

According to an embodiment of the present invention, a method is provided for transmitting an emoticon to another party in video telephony communication. Another party's video data is displayed on a first area of a display unit, a user's video data is displayed on a second area of the display unit, and a plurality of emoticons is displayed on a third area of the display unit in a video telephony communication. One of the plurality of emoticons is selected during the video telephony communication from a user input. The selected emoticon is displayed on the first area or on the second area and transmitting the selected emoticon to another party.

According to another embodiment of the present invention, a method is provided for conveying an emoticon to another party in video telephony communication. Another party's video data is displayed on a first area of a display unit, a user's video data is displayed on a second area of the display unit, and a plurality of emoticons is displayed on a third area of the display unit in a video telephony communication. One of the plurality of emoticons is selected during the video telephony communication from a user input. The selected emoticon is displayed on the first area or on the second area, the selected emoticon is stored in a temporary memory for at least one of displaying and transmission of the selected emoticon to another party.

Accordingly to a further embodiment a wireless terminal comprising a transmitter, a display unit, and a controller. The controller is configured to display another party's video data on a first area of a display unit, a user's video data on a second area of the display unit, and a plurality of emoticons on a third area of the display unit in a video telephony communication. The controller is configured to displays the user selected emoticon in the first area or in the second area. The transmitter, being responsive to the controller, transmits the user selected emoticon to another party during the video telephony communication Other objects, advantages and salient features of the invention will become apparent to those skilled in the art from the following detailed description which, taken in conjunction with the annexed drawings, discloses exemplary embodiments of the invention.

BRIEF DESCRIPTION OF THE ATTACHED DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
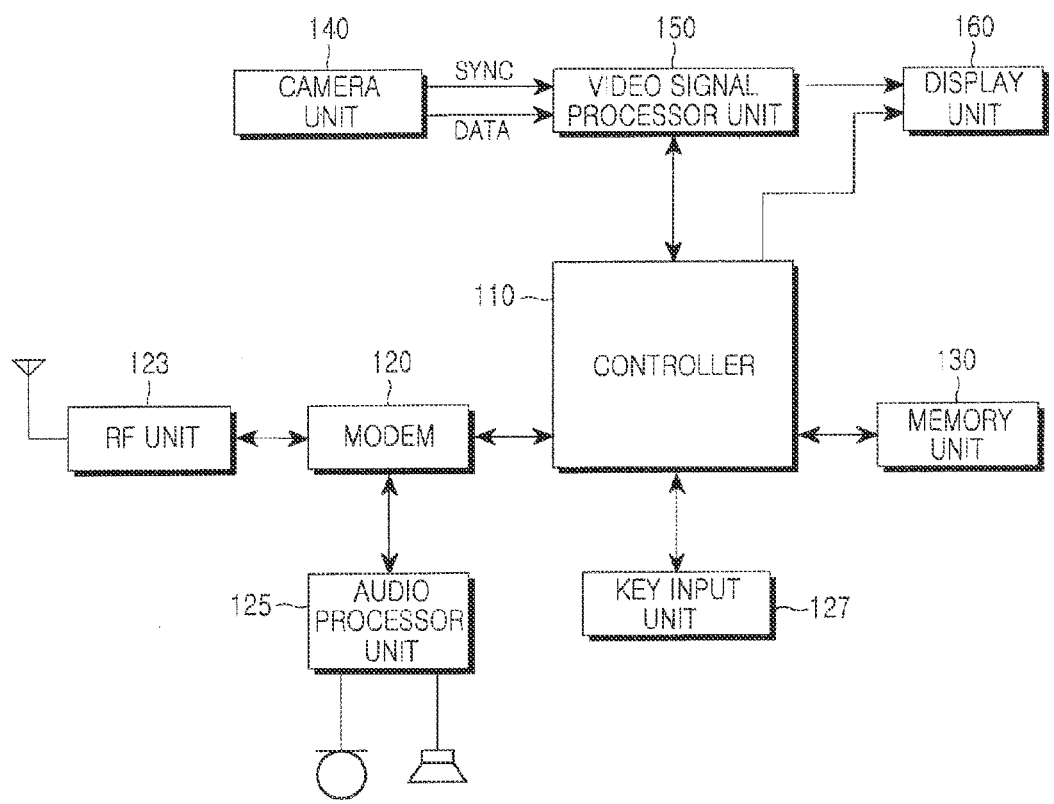
FIG. 1 is a block diagram for illustrating the functional structure of a wireless terminal according to an exemplary embodiment of the present invention.

Referring to FIG. 1, an RF unit 123 for wireless communication comprises an RF transmitter for modulating and amplifying the frequency of a transmitted signal and an RF receiver for demodulating and low-noise amplifying a received signal. A modem 120 transforms digital signals from a controller 110 into corresponding analog signals which are delivered to the RF unit 123. The modem 120 also transforms the analog signals from the RF unit into corresponding digital signals which are delivered to an audio processor 125 or the controller 110. The audio processor 125 comprises a data codec for processing packet data and an audio codec for processing audio signals such as voice signals. The audio processor 125 converts digital audio signals from the modem 120 into corresponding analog signals delivered to a speaker. The audio processor 125 also converts analog audio signals from a microphone into corresponding digital signals delivered to the modem 120. The audio processor may be a separate unit or a built-in element of the controller 110.

A memory unit 130 comprises a program memory and a data memory. The program memory stores programs for controlling the general operations of the wireless terminal including programs for controlling the procedure of displaying and transmitting an emoticon in the video telephone mode according to the present invention. Meanwhile, the data memory temporarily stores data generated during execution of the programs. The data memory also stores various kinds of emoticon including downloaded data and video data. The kinds of emoticon made of video data include those taken by the wireless terminal and stored as emoticon format, and those previously stored as emoticon format.

The controller 110 controls all functions of the wireless terminal and may be designed so as to include the modem 120 and the audio processor 125. The controller 110 also controls the memory 130 so as to display emoticon stored and to transmit a selected kind of emoticon when the wireless terminal is in the video telephone mode.

Also provided is a camera unit 140 which comprises a camera sensor for converting optical signals of a captured image into corresponding electrical signals, and a signal processor for converting the electrical signals from the camera sensor into corresponding digital data. The camera sensor may be a CCD sensor, and the signal processor a DSP (Digital Signal Processor). The camera sensor and the signal processor may be integrally combined, or separately formed.

A video signal processor unit 150 processes video signals from the camera unit 140 by frames so as to generate frame video data fitting the characteristics and size of a display unit 160. The video signal processor unit 150 includes a video codec to compress the frame video data or decompress the compressed frame video data according to a prescribed process. The video codec may be JPEG, MPEG4, Wavelet, and the like. The video signal processor unit 150 is provided with an OSD (On Screen Display) function to generate OSD data according to the screen size under the control of the controller 110.

The display unit 160 displays both the video signals from the video signal processor unit 150 and user data transferred from the controller 110. The display unit 160 may comprise an LCD unit, LCD controller, and memory for storing the video data. The LCD unit may be formed with a touch screen to serve as an input unit. The display unit 160 also displays different kinds of emoticons and a selected emoticon when the wireless terminal is in the video telephone mode.

A key input unit 127 includes keys for inputting information such as numbers and characters as well as keys for setting various functions. The key input unit 127 may also be provided with a particular key for selecting an emoticon and displaying and transmitting a selected emoticon. Alternatively, separate particular keys may be provided for the different functions of selecting, displaying and transmitting.

Hereinafter is described a process for displaying and transmitting an emoticon, according to an exemplary embodiment of the present invention, with reference to FIGS. 2 and 3A-C.

Figure 2:
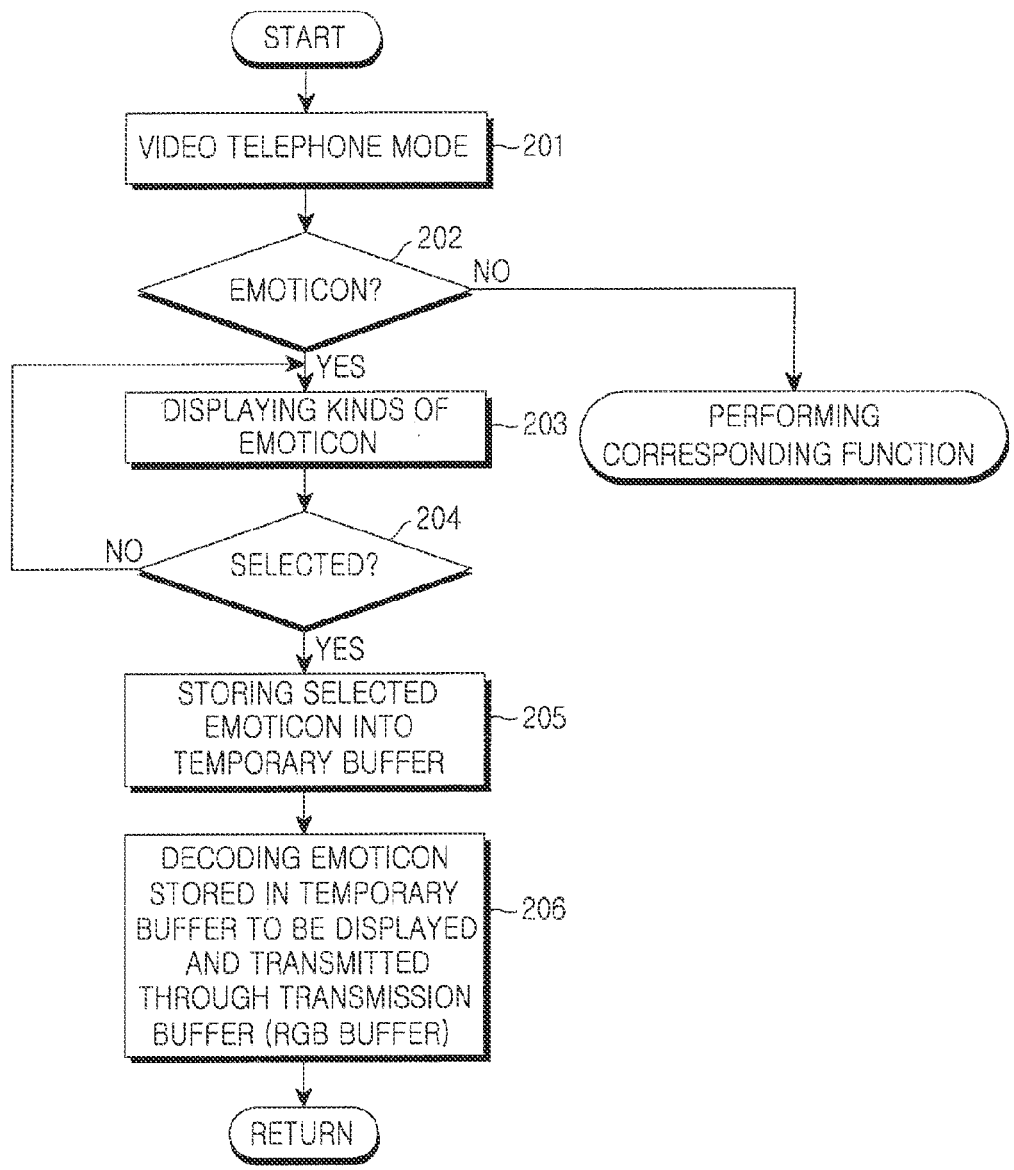
FIG. 2 is a flow chart for illustrating an exemplary implementation of a method of displaying and transmitting an emoticon in the video telephone mode of a wireless terminal according to an embodiment of the present invention.

Referring to FIG. 2, when an emoticon function is selected in the video telephone mode of the wireless terminal in step 201, the controller 110 controls, in step 202, the memory unit 130 to display at least one emoticon stored therein in step 203. The controller controls, in step 203, the display 160 to present at least one of the different kinds of emoticon stored in the memory unit 130. Any kind of emoticon stored in the memory unit 130 may be selected by the user for display. The emoticon(s) may be displayed in, for example, a bar type format.

The emoticon(s) may be downloaded into the memory unit 130. In addition, the emoticon(s) may include video data taken by the camera unit 140 of the wireless terminal that have been scaled to the emoticon format and stored in the memory unit 130. Also, the emoticon(s) may be selected from the video data that have already been stored in the memory unit 130, scaled to the emoticon format and stored again into the memory unit 130.

Figure 3A:
FIGS. 3A to 3C illustrate the procedure of FIG. 2.

FIG. 3A shows an example of emoticons being presented in a bar type format in step 203. As shown in FIG. 3A, the display is divided into three zones, namely, a first zone 300 for displaying the other party's video data, a second zone 310 for displaying the user's video data, and a third zone 320 for displaying emoticon(s) in a bar type format.

In step 204, a user may select one of the emoticon displayed in the bar type format as shown in FIG. 3A by using, for example, an arrow key. After an emoticon is selected, the controller 110 directs the memory unit 130 to store the selected emoticon into a temporary buffer in step 205. The controller 110 also temporarily blocks the user's video data from being displayed in the second zone 310 as shown in FIG. 3A and decodes the selected emoticon stored in the temporary buffer so that it may be displayed in the second zone 310 in step 206.

Also in step 206, the controller 110 directs the temporary buffer to transfer the selected emoticon to a transmission buffer (RGB buffer) to transmit it to the wireless terminal of another party, which then displays the received emoticon instead of the other party's video data.

Figure 3B:
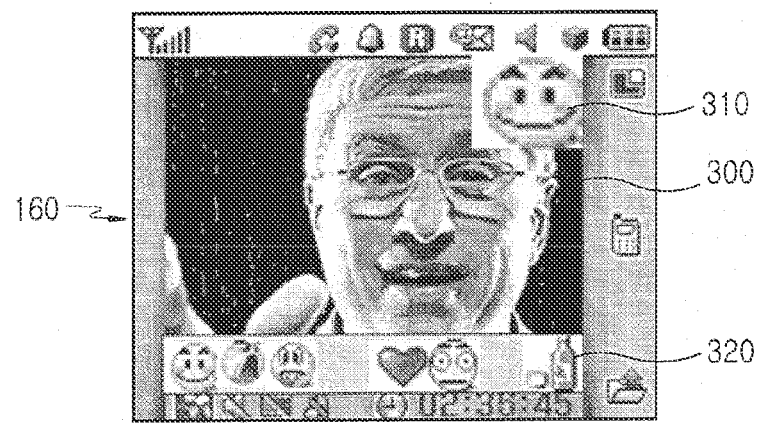
Figure 3C:
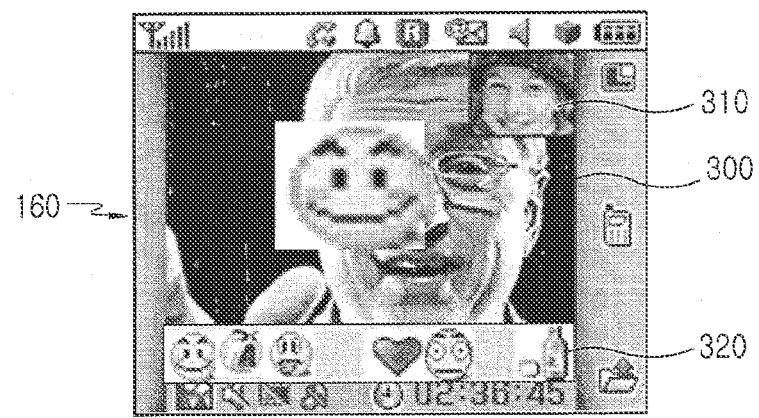

In step 206, the selected emoticon may be displayed in the second zone 310 in place of the user's video data as shown in FIG. 3B. Alternatively, the selected emoticon may be superimposed on the other party's video data being displayed in the first zone 300 as shown in FIG. 3C. In case of FIG. 3C, the user's video data is continuously displayed in the second zone 310 while the other party's terminal receives the selected emoticon instead of the user's video data. Namely, the controller 110 may superimpose the selected emoticon decoded on a portion of the first zone 300 as well as display the user's video data in the second zone 310 in real time, as shown in FIG. 3C.

Referring back to FIG. 3B, the pre-selected emoticon may be displayed in the second zone 310 for a predetermined time and thereafter automatically replaced by the user's video data. Otherwise, selection by the user may cause the pre-selected emoticon to be removed from the second zone 310 and the user's video data to be displayed instead.

Similarly, referring again to FIG. 3C, the pre-selected emoticon may be superimposed in the first zone 300 for a predetermined time and thereafter automatically replaced by the other party's video data. Otherwise, selection by the user may cause the pre-selected emoticon to be removed from the first zone 300 and the other party's video data to be displayed instead. While displaying and transmitting the emoticon in the video telephone mode as shown in FIGS. 2 and 3A-C, the user may simultaneously perform voice communication with the other party by exchanging audio data.

Thus, the inventive method provides the user of the wireless terminal with means for transmitting an emoticon representing an emotion to the other party, so that the video communication may become more vivid and friendly.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
presenting, via a display disposed on an electronic device, a first user image for video telephony communication received from an external electronic device connected to the electronic device and a second user image for video telephony communication obtained using an image sensor of the electronic device;
presenting, via the display, a third image in a user interface based on a user input;
displaying, on at least one of a first area corresponding to the first user image and a second area corresponding to the second user image, the third image selected from the user interface, wherein the selected third image from the user interface is superimposed on at least one of the first user image and the second user image; and
transmitting data corresponding to the selected third image from the user interface that is displayed on at least one of the first area and the second area to the external electronic device while a screen displayed on the display is divided into a plurality of areas including the first area, the second area, and a third area that is used to display the user interface.

2. The method of claim 1, wherein the first user image comprises a video associated with a user of the external electronic device and the second user image comprises a video associated with a user of the electronic device.

3. The method of claim 1, wherein the presenting of the first user image and the second user image comprises:
displaying the first user image on the first area; and
displaying the second user image on the second area.

4. The method of claim 1, wherein the user interface comprises:
at least one of an emotion-related image, a facial expression-related image, a face-shaped image, a heart-shaped image and a bottle-shaped image.

5. The method of claim 1, wherein the presenting of the user interface comprises:
displaying at least a portion of the user interface in a bar type format.

6. The method of claim 1, wherein the displaying comprises:
displaying the user interface and at least a portion of the first user image on the first area.

7. The method of claim 1, wherein the displaying is performed during a video communication between the electronic device and the external electronic device.

8. The method of claim 1, wherein the transmitting is performed simultaneously with an audio communication between the electronic device and the external electronic device.

9. An apparatus comprising:
a receiver to receive a first user image for video telephony communication from an external electronic device connected to the apparatus;
a image sensor to obtain a second user image for video telephony communication in relation with a user of the apparatus; and
a processor-implemented controller operatively coupled with the receiver and the image sensor, the processor-implemented controller configured to:
display the first user image on a first area of a display operatively coupled with the apparatus and the second user image on a second area of the display;
display a third image selected from a user interface based on a user input;
display the third image selected from the user interface on at least one of the first area and the second area, wherein the third image selected from the user interface is superimposed on at least one of the first user image and the second user image; and
transmit data corresponding to the third image selected from the user interface that is displayed on at least one of the first area and the second area to the external electronic device while a screen displayed on the display is divided into a plurality of areas including the first area, the second area, and a third area that is used to display the third image selected from the user interface.

10. The apparatus of claim 9, wherein the plurality of third images comprises:
at least one of an emotion-related image, a facial expression-related image, a face-shaped image, a heart-shaped image or a bottle-shaped image.

11. The apparatus of claim 9, wherein the processor-implemented controller is configured to:
display at least a portion of the user interface in a bar type format.

12. The apparatus of claim 9, wherein the processor-implemented controller is configured to:
display the user interface and at least a portion of the first image on the first area.

13. The apparatus of claim 9, wherein the user interface is displayed during a video communication between the apparatus and the external electronic device.

14. The apparatus of claim 9, further comprising:
a transmitter to transmit, to the external electronic device, at least one of data corresponding to the user interface and data corresponding to the second user image.

15. A non-transitory computer-readable storage device storing instructions that, when executed by one or more processors, cause the one or more processors to perform operations comprising:
presenting, via a display operatively coupled with an electronic device, a first user image received from an external electronic device connected to the electronic device and a second user image obtained using an image sensor;
presenting, via the display, a third image selected from a user interface based on a user input;
displaying, on at least one of a first area corresponding to the first user image and a second area corresponding to the second user image, the third image selected from the user interface, wherein the third image selected from the user interface is superimposed on at least one of the first user image and the second user image; and
transmitting data corresponding to the third image selected from the user interface that is displayed on at least one of the first area and the second area to the external electronic device while a screen displayed on the display is divided into a plurality of areas including the first area, the second area, and a third area that is used to display the user interface.

\* \* \* \* \*